United States Patent [19]

Brown

[11] 3,943,409
[45] Mar. 9, 1976

[54] MONITOR ASSEMBLY FOR GROUND FAULT INTERRUPTER

[75] Inventor: William Keith Brown, Lexington, Ky.

[73] Assignee: Square D Company, Park Ridge, Ill.

[22] Filed: Aug. 13, 1974

[21] Appl. No.: 497,019

[52] U.S. Cl. ........ 317/18 R; 317/33 SC; 340/253 N; 340/253 S
[51] Int. Cl.² .......................................... H02H 3/28
[58] Field of Search.......... 317/9 D, 18 R, 18 D, 52, 317/57, 33 SC; 340/253 R, 253 S, 253 N, 253 A, 253 H; 307/252 B

[56] References Cited
UNITED STATES PATENTS

| | | | |
|---|---|---|---|
| 3,482,236 | 12/1969 | Seney | 340/253 A X |
| 3,619,723 | 11/1971 | Walden | 317/18 R |
| 3,666,988 | 5/1972 | Bellis | 307/252 B X |
| 3,680,070 | 7/1972 | Nystuen | 307/252 B X |
| 3,700,967 | 10/1972 | Hoss | 317/33 SC |
| 3,727,080 | 4/1973 | Hanchett | 307/252 B |
| 3,809,985 | 5/1974 | Krause et al. | 340/253 A X |

Primary Examiner—J. D. Miller
Assistant Examiner—Patrick R. Salce
Attorney, Agent, or Firm—Harold J. Rathbun; Ernest S. Kettelson

[57] ABSTRACT

A monitor assembly comprising an indicator, such as a lamp, operable when a ground fault occurs in a protected circuit to show that the circuit has been interrupted. A separate power source is provided for the indicator circuit to keep the lamp lit throughout the time the protected circuit is interrupted, with electronic switching means in the indicator circuit to turn on the indicator lamp upon receipt of a voltage signal from the ground fault interruption circuit indicating interruption of the protected circuit. A test circuit is provided, also powered by the separate power source, to test operation of the ground fault interruption circuit. A manually operated switch is provided to energize the test circuit. For convenience, the indicator is described in this embodiment as a lamp but it may be any electrically operable indicating means, audible as well as visual.

2 Claims, 2 Drawing Figures

MONITOR ASSEMBLY FOR GROUND FAULT INTERRUPTER

BACKGROUND OF THE INVENTION

This invention pertains to the field of indicators and associated circuitry that provide a signal when a protected circuit has been interrupted, particularly circuits protected against ground faults, and which incorporate testing means therein.

Heretofore, such indicators and testing means have utilized power from the protected circuit. Indicators which rely on power from the protected circuit become inoperative after a ground fault occurs that interrupts such circuit. It is desirable to provide a continuous signal to indicate presence of a ground fault interruption throughout its duration. It is also desirable to have a separate power source to energize a test circuit.

The testing and indicating components and circuitry of this invention provide such separate power source independent of the circuit being protected, including associated electronic means for regulating voltage, detecting an interruption voltage signal and switching to activate an indicator upon occurrence of a circuit interruption and throughout the duration thereof.

SUMMARY OF THE INVENTION

It is an object of this invention to provide improved testing and indicating means for a ground fault protection system, said testing and indicating means being incorporated in a monitor panel assembly.

It is an object of this invention to provide testing and indicating components and circuitry incorporated in a monitor panel for a ground fault protection system in which the testing and indicating circuit is powered independently of the protected circuit.

It is an object of this invention to provide electrically energized signal means to indicate that a protected circuit has been interrupted due to a ground fault, and to so indicate throughout the duration of such circuit interruption.

DESCRIPTION OF A PREFERRED EMBODIMENT

Figure 1:
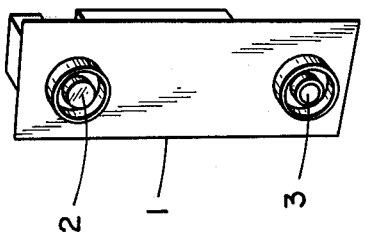
FIG. 1 is a front elevation view of a monitor panel showing an indicator lamp and a test button mounted therein in accordance with this invention.
Figure 2:
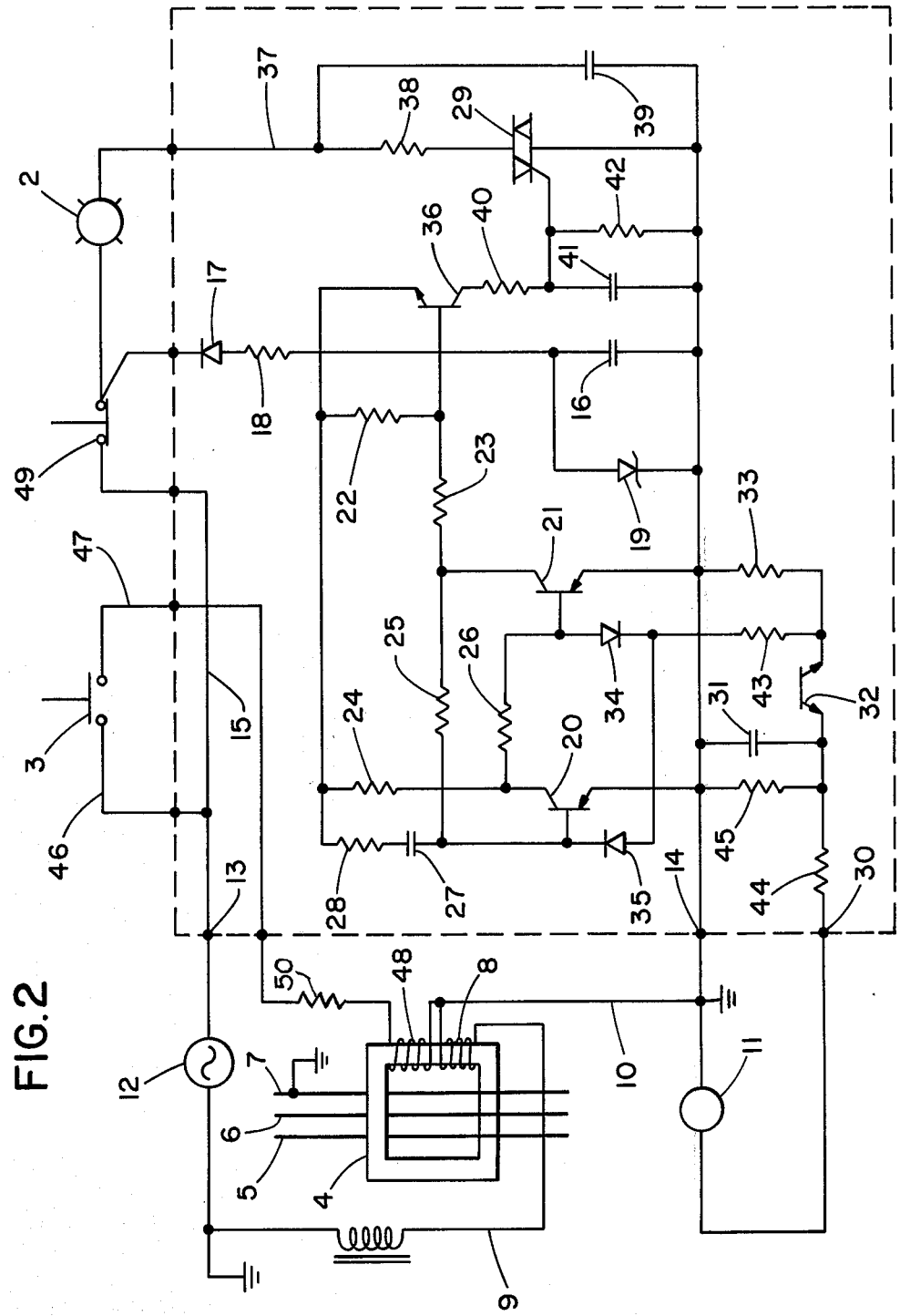
FIG. 2 is a schematic diagram of the indicating and test circuit and components in accordance with this invention.

The test and indicator assembly in FIG. 1 includes a monitor panel 1 having an indicator lamp 2 and a test push button 3 mounted for viewing and operation respectively on the front face thereof. The circuitry and components shown in FIG. 2 are mounted on the back of monitor panel 1. The assembly is used in conjunction with a ground fault protection system, part of which is shown schematically in FIG. 2. A ground fault sensing device is shown consisting of differential transformer 4, and passing through as a single turn primary are power conductors 5 and 6 plus neutral conductor 7.

A voltage is induced in secondary winding 8 on the leg of the differential transformer when a ground fault occurs causing an imbalance between power and neutral conductors. Secondary winding 8 leads to the ground fault protection circuit which includes conductors 9 and 10 and trip coil 11, the latter being connected to switch means not shown which open and interrupt the protected circuit on occurrence of a ground fault sufficient to energize trip coil 11.

These portions of the ground fault interruption circuit are illustrated to show the relationship of the test and indicator assembly, and its associated circuits which will now be described.

A separate AC power source 12 is provided for connection to terminals 13 and 14 of the monitor panel assembly. Conductor 15 leads from terminal 13 to charge capacitor 16 through diode 17 and resistor 18 to the zener voltage of Zener diode 19.

This provides the D.C. power for operation of the test and indicator circuit.

Transistors 20 and 21, of the P-N-P type, together with resistors 22, 23, 24, 25 and 26 form a bistable circuit. When power is supplied, capacitor 27 and resistor 28 provide a momentary current through the base of transistor 20 turning it on to assure that the appropriate initial state is obtained, i.e. that triac 29 is not energized.

When shunt trip coil 11 is energized, by voltage induced on occurrence of a ground fault, the same voltage appears across terminals 14 and 30 of the monitor panel assembly. This also causes a voltage to appear across capacitor 31. When the voltage across capacitor 31 reaches the switching voltage of bilateral trigger 32, capacitor 31 is discharged through resistor 33. This causes either (1) a current to flow out of the base of transistor 21 thereby turning it on, or (2) a reverse bias voltage to appear across the base of transistor 20 causing it to turn off, depending on the polarity of the voltage appearing on capacitor 31. Diodes 34 and 35 steer the pulses to the appropriate transistor, for example negative voltage directed to the base of transistor 21 through diode 34 and positive voltage directed to the base of transistor 20 through diode 35.

As transistor 21 turns on, current flows through resistor 23, resistor 22 and the base emitter junction of N-P-N transistor 36 turning the transistor on. This energizes the gate circuit of triac 29 turning it on, current thereby flowing through conductor 37 and resistor 38 to light indicator lamp 2. The resistor 38 is provided to protect against inrush current. Capacitor 39 is connected in parallel with triac 29 for voltage rise protection. Resistor 40 sets the drive level on the gate of triac 29 while capacitor 41 and resistor 42 act as noise suppressors to prevent false turn on of triac 29.

Resistor 43 acts as a current limiter when the voltage on capacitor 31 is negative with respect to terminal 30. Resistor 44 provides the necessary impedance to prevent excessive loading on trip coil 11 if capacitor 31 fails as a short circuit thus assuring that the trip coil will pick up. Resistor 45 has a high value of resistance to provide a discharge path for capacitor 31. Resistor 44 and capacitor 31 form a low pass filter to help prevent transient turn on.

Push button 3 is provided to close a switch that actuates the test circuit, comprising conductors 46 and 47, resistor 50 and test winding 48 wound on a leg of differential transformer 4 with an end of the test winding connected to secondary winding 8. Conductor 46 is connected to power source 12 through conductor 15 to supply power to the test circuit. When push button 3 is depressed to close the normally open switch and energize the test circuit, the secondary winding 8 and ground fault interruption circuit including trip coil 11 are energized for testing the operation thereof. Indicator lamp 2 will light indicating an interruption of the protected circuit if the ground fault interruption means is operating properly.

A second push button 49 may be provided to open a normally closed switch in series with indicator lamp 2. When depressed to open the circuit, current is momentarily interrupted through triac 29 thus turning it off and also turning off indicator lamp 2. When push button 49 is released to again close the indicator circuit, a pulse of current flows through capacitor 27, resistor 28 and the base of transistor 20 to assure that transistor 21 is turned off and triac 29 is not energized. The circuit is then in a non-conducting ready condition to again light indicator lamp 2 on occurrence of a ground fault interruption or to again test the ground fault interruption circuit.

What I claim is:

1. A monitor assembly for testing and indicating presence of a ground fault interruption in a protected circuit, including electrically powered indicator means therein operable to provide a signal during the existence of a ground fault interruption in said protected circuit, including an alternating current power source independent of the protected circuit, an indicator circuit and associated components being incorporated in said monitor assembly, said independently powered indicator circuit including said indicator means, rectifying means to provide a rectified power supply for said indicator circuit, voltage regulation means to regulate the voltage in said indicator circuit, detecting means responsive to ground fault interruption in said protected circuit, and electronic switch means operably associated with said detecting means to close said independently powered indicator circuit and energize said indicator means upon occurrence of a ground fault interruption in said protected circuit and to supply power to continuously energize said indicator means during the existence of said ground fault interruption, wherein said electronic switch means includes a bistable circuit having first and second transistors connected in parallel, a bilateral trigger component having a pre-selected switching voltage value in conjunction with a capacitor and a resistor connected to said detecting conductors for receiving said signal voltage, two diodes connected in parallel between said bilateral trigger component and a respective one of said transistors, the anode of one of said diodes connected to the base of the said first transistor thereby turning it on, the cathode of the other of said diodes connected to the base of said second transistor to cause a reverse bias voltage to appear across said base of said second transistor to cause it to turn off, a triac component connected between said bistable circuit and said indicator means, a third transistor in said circuit, said third transistor connected between said bistable circuit and the gate of said triac component for energization thereof upon current flow from said bistable circuit to said third transistor to turn it on and thereby energize said triac for current flow from said independent power source through said triac and to said indicator means causing it to produce an indicating signal upon receipt of said signal voltage indicating a ground fault interruption in said protected circuit and to remain energized continuing to indicate ground fault interruption after current has ceased to flow in said interrupted protected circuit.

2. A monitor assembly as set forth in claim 1, wherein said indicator means is an indicator lamp, said indicator lamp also being mounted on said panel for viewing from the front face thereof.

* * * * *